United States Patent [19]

Bogner et al.

[11] 3,748,615

[45] July 24, 1973

[54] SUPERCONDUCTING MAGNET COIL

[75] Inventors: Günther Bogner, Tennenlohe; Helmut Kuckuck, Erlangen, both of Germany

[73] Assignee: Siemens Aktiengesellschaft, Berlin and Munich, Germany

[22] Filed: May 7, 1969

[21] Appl. No.: 822,497

[30] Foreign Application Priority Data

May 7, 1968 Germany .................. P 17 64 268.1

[52] U.S. Cl. ............... 336/60, 335/216, 336/DIG. 2

[51] Int. Cl. ........................................ H01f 27/10

[58] Field of Search ...................... 336/60, 250 UX; 335/216

[56] References Cited

UNITED STATES PATENTS

| | | | |
|---|---|---|---|
| 3,167,692 | 1/1965 | Matthias | 335/216 |
| 3,393,386 | 7/1968 | Hintz | 335/216 |
| 3,433,705 | 3/1969 | Connish | 335/216 X |
| 3,444,307 | 5/1969 | Kafka | 335/216 X |
| 3,440,336 | 4/1969 | Bogner | 335/216 |
| 3,466,581 | 9/1969 | Albrecht et al. | 335/216 X |

FOREIGN PATENTS OR APPLICATIONS

| | | | |
|---|---|---|---|
| 1,081,058 | 8/1967 | Great Britain | 336/250 UX |

*Primary Examiner*—Thomas J. Kozma
*Attorney*—Curt M. Avery, Arthur E. Wilfond, Herbert L. Lerner and Daniel J. Tick

[57] ABSTRACT

Described is a superconducting magnet coil wherein a superconductor is arranged in several winding layers and channels admitting a coolant, which are formed by cooling strips, are between the winding layers. The superconducting magnet coil is characterized in that the height of the cooling channels is approximately 0.1 to 0.2 mm.

4 Claims, 3 Drawing Figures

SUPERCONDUCTING MAGNET COIL

Figures 1, 2:
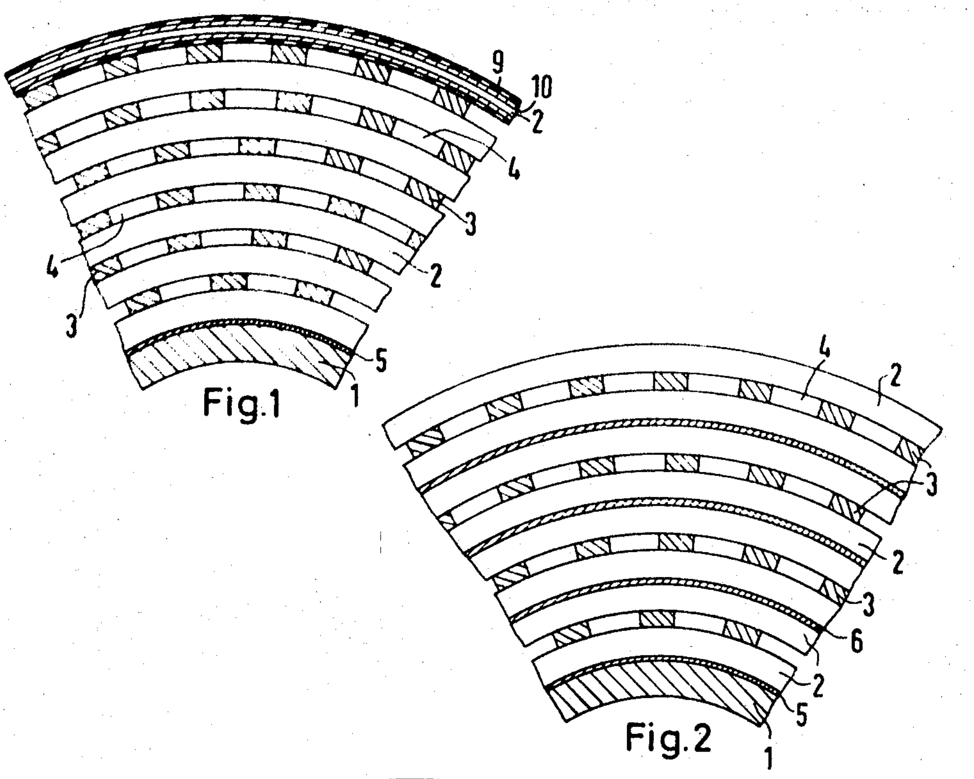

Our invention relates to a superconducting magnet coil, wherein a superconductor is arranged with several winding layers and channels for coolants between the layers of winding.

It is known to provide cooling channels between the layers of winding, in large magnet coils having windings of superconducting wires or tapes, particularly magnetic coils comprised of electrically stabilized conductors composed of superconducting material and normal conducting metals. The greatest part of the conductor surface is in direct heat exchange with the coolant, which has penetrated into the cooling channels formed with the aid of cooling strips. This affords an optimum functioning of the magnetic coil, preventing to a large extent the so-called "current degradation." Helium is the preferred cooling agent and the superconductors, preferably, are uninsulated so that additional heat resistances can be avoided in the thermal current path.

To cool the superconductors of the coil windings in this manner, it is preferable to work within the range of the so-called "bubble evaporation." A transition into the range of so-called "film evaporation," whereby the conductor surface wetted by the coolant is coated with a gas film, is to be avoided since, in this range, the temperature transition between conductor surface and coolant is generally so great, that cooling-down of the superconductor below the transition point is not assured. The temperature difference between conductor surface and coolant at which this transition takes place depends on the height of the cooling ducts and also on the height of the cooling strips. According to measurements which were published, e.g., by M. N. Wilson in "Proceedings of the IRR Commission, Paper Number II/2 Boulder, Colorado 1966," lower limit for the height of the cooling strips is between 0.5 and 0.6 mm. Due to the small difference in temperature between the conductor surface and the cooling agent, which effects the transition into the range of film evaporation, the cooling and, thereby, the stabilization of high magnetic fields, can no longer be obtained for cooling strips having a height below 0.5 to 0.6 mm.

This height can be used for large superconducting coils, i.e., magnet coils having a diameter of 1 m and above and a winding stack thickness of approximately 20 cm and above. In superconducting magnet coils with small and average diameters, i.e., diameters of up to 50 cm, cooling strip heights between 0.5 and 0.6 mm produce an increase in the thickness of the stack of windings, that is a reduction in the packing factor, which can not be tolerated since this strongly reduces the effective current density upon which the magnitude of the magnetic field depends. Hence, the surface of the superconductor is generally not provided with direct cooling in coils of the afore-indicated diameter size. This strongly impairs the stability of the obtained high magnetic fields and the magnitude of the feasible coil currents.

The problem is to obtain, especially for coils with small and average diameters, a large packing factor, the highest possible coil current (equal to or almost that of the critical current) and to produce, thereby, a high effective current density together with a direct cooling of the superconducting surface.

To this end, and in accordance with the invention, we resolve the problem by using cooling strips whose height amounts to approximately 0.1 to 0.2 mm.

Surprisingly, tests have shown that, contrary to the opinion prevalent in the art, cooling strips of the indicated height afford a high stability for magnetic fields of high field intensity, at a current force which is almost the same or equal to the critical current force of the superconductor. The high stability is afforded by a direct cooling of the conductor surface in the cooling channels. At the same time, due to the small height of the cooling strips, a high packing factor and, thereby, a high effective current density is maintained and the production of high, stable magnetic field forces is possible with a minimum utilization of superconducting material.

It is preferable to coat the superconductor with a layer of insulating material whose thickness amounts to about 10 $\mu$m. Due to the slight layer thickness, the electrically insulated layer does not yet entail an essential heat resistance, which could affect the cooling of the superconductors and, thereby, the stability of the obtained magnetic fields.

In a preferred embodiment, the cooling strips are so arranged, that only one side of each winding layer is wetted by the coolant.

Figure 3:
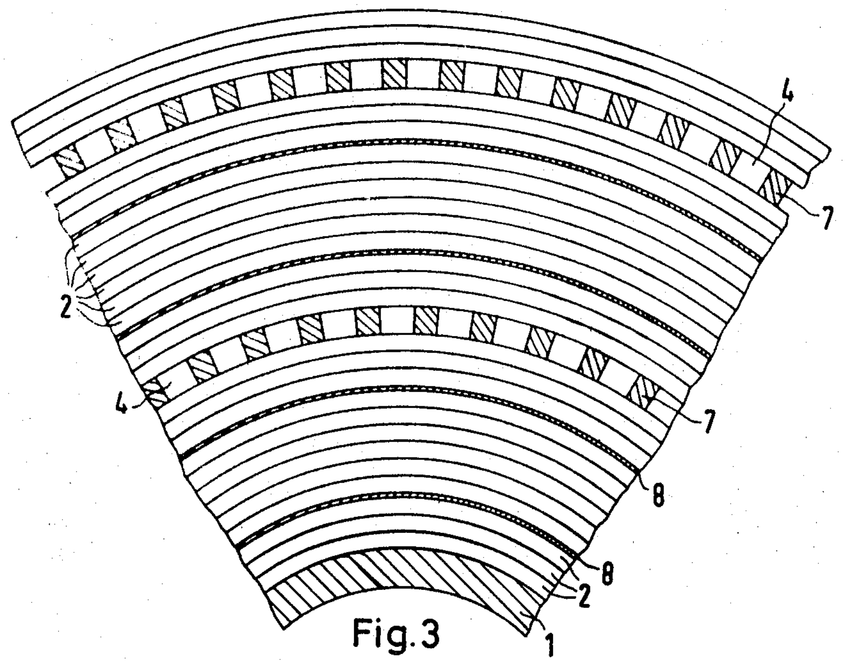

The following will illustrate the invention in examples, shown in FIGS. 1 to 3 wherein FIG. 1 shows a top view of a sector of a magnet coil, according to the invention;

FIG. 2 shows a sector of another embodiment of a coil according to the invention; and FIG. 3 shows a sector of a top view of a magnetic coil according to the prior art.

In FIG. 1, several winding layers of a superconductor 2 are arranged upon a coil body 1 of anti-magnetic steel. The material used for the superconductor can be NbTi provided with metallurgically applied copper; $Nb_3Sn$ coated with copper or silver, or NbZr having a copper layer. Cooling strips 3, provided between individual layers of winding and forming the cooling channels 4, are positioned in parallel to the coil axis. The cooling channels 4 are penetrated by a coolant, for example helium, which cools, in a direct heat exchange, the surfaces of the superconductors 2. The width of the cooling strips 3 is at least the same as the thickness of the superconductors 2. The height of the cooling strips 3 is between 0.1 and 0.2 mm. The distance between two successive cooling strips and, thus, the width of the cooling ducts, is such that a drooping of the superconductors 2 is prevented. The cooling strips are comprised of synthetic material, for example of "Hostaphan." The conductor of the outermost winding layer is shown in section, so that the copper or silver coating 10 can be seen.

The superconductors are surrounded with a layer 9 of insulating material, having a layer thickness of, approximately, 10 $\mu$m. "Formvar" varnish or another varnish, suitable for low temperatures, can serve as insulating material. The layer thickness is such that, on one hand, the heat resistance is virtually not increased and the packing factor is hardly reduced, while on the other hand, a mutual insulation between the superconductors 2 is ensured. An additional insulating layer 5 is furthermore provided between the coil body 1 and the first winding layer of superconductors 2, and can be comprised, for example, of Hostaphan foil.

In FIG. 2, the cooling strips are provided only between two successive winding layers of superconductors 2. The height of the cooling strips is again about 0.1 to 0.2 mm and the remaining dimensions of the cooling channels are analogous to FIG. 1. In this arrangement, the winding layers of the superconductors 2 are cooled only on one side. Synthetic foils 6 arranged directly between superimposed winding layers for additiional electrical insulation. These foils can also be comprised of Hostaphan. In this arrangement, the packing factor is further increased relative to the arrangement according to FIG. 1, whereby an impairment of the cooling could not be determined in tests.

FIG. 3 illustrates a magnet coil, seen in top view upon a section of a sector. In this magnet coil, a direct cooling of layers of windings is realized only to a limited extent and in accordance with prevalent opinion of the art. Successively arranged upon the coil body 1 are: three winding layers of superconductors 2; a copper foil 8, six winding layers; a second copper foil 8; three winding layers and only then, the cooling strips 7. Thereafter the indicated winding scheme is repeated. The height of the cooling strips is about 0.6 mm. As a result, this type of coil cannot accommodate a large number of cooling strips 7 in order not to reduce the packing factor of the coil, to an excessive degree. Helium can penetrate as a coolant, the cooling channels 4, formed by the cooling strips 7. The copper foils 8 are provided so as to obtain a heat removal also in the winding layers which are not cooled directly. Not shown in the drawing are Hostaphan foils, about 15 $\mu$m in thickness, which are arranged between layer windings that are superimposed directly.

Tables 1 and 2 indicate measuring values which permit a direct comparison between a coil constructed according to FIG. 2 and one according to FIG. 3.

The values indicated in Table 1 were obtained with a coil according to FIG. 2, which has an inside diameter of 50 mm and an outside diameter of 140 mm. The coil is wound with an NbTi wire of 0.40 mm diameter, including copper which is protected with a varnish insulation of 10$\mu$ thickness. The length of the wire amounts to about 3.8 km with 43 winding layers. 14,000 windings were applied which corresponds to a winding density of 462/cm$^2$. Hostaphan strips are installed between every second winding layer. The strips have thickness of 0.2 mm and a width of 2 mm. The mutual distance amounts to 2 mm. A Hostaphan foil of 15 $\mu$m thickness is arranged between each adjacent winding layer.

The dimensions of the coils of FIG. 3 which provided the measured values of Table 2 are identical with the measurements of the coil according to the measured values of Table 1. The same wire was used for these windings. The length of the wire amounts to 3.86 km with 44 winding layers. 14,410 windings were applied which corresponds to a winding density of 501/cm$^2$. Thus, the winding density is slightly increased to that of the coil, which supplied the values of Table 1. The winding scheme corresponds to the one shown in FIG. 3. The thickness of the used cooling strips is 0.6 mm, their width and their mutual distance also corresponds to the magnet coil, used to supply the measured values, seen in Table 1.

For measuring purposes, both coils were cooled to about 4° K and excited. The current force was increased for each measuring point for such a time until the transition of the magnet coils into a normal-conducting state could be detected. The current density ($I_{crit}$) and the magnetic field ($H_{crit}$) measured thereby, are indicated in Tables 1 and 2.

TABLE 1

| | $I_{crit}$ [A] | $H_{crit}$ [kOe] |
|---|---|---|
| 1 | 50.75 | 56.6 |
| 2 | 52.5 | 59.1 |
| 3 | 52.25 | 58.75 |
| 4 | 52.5 | 59.05 |

TABLE 2

| | $I_{crit}$ [A] | $H_{crit}$[kOe] |
|---|---|---|
| 1 | 29.4 | 33.7 |
| 2 | 37.4 | 42.9 |
| 3 | 42.4 | 48.9 |
| 4 | 25 | 28.6 |
| 5 | 45.2 | 51.6 |

A comparison of both tables shows that a higher magnetic field can be produced with a magnetic field coil, constructed according to the invention. Of particular notice is the stability of the magnetic field, as seen in Table 1. This magnetic field can be reproduced almost unmistakably; the fields obtained at various excitations fluctuate only by 5%. Table 2, however, shows fluctuations amounting up to 100%.

We claim:

1. Superconducting magnet coil wherein a superconductor is arranged in several winding layers and channels admitting a coolant are provided between the winding layers, the height of said channels is 0.1 to 0.2 mm, said cooling channels being so arranged that each winding layer is wetted by the coolant on one side only.

2. The coil of claim 1, wherein the superconductor is coated with a layer of insulating material approximately 10$\mu$m thick.

3. The coil of claim 1, wherein NbTi with metallurgically applied copper is the superconductor.

4. The coil of claim 1, wherein $Nb_3Sn$, coated with copper or silver is the superconductor.

* * * * *